(12) United States Patent
Brown et al.

(10) Patent No.: US 8,761,826 B2
(45) Date of Patent: Jun. 24, 2014

(54) UPLINK POWER CONTROL IN COORDINATED MULTI-POINT WIRELESS COMMUNICATION SYSTEM

(75) Inventors: Tyler A. Brown, Mundelein, IL (US); Vijay Nangia, Algonquin, IL (US); Krishna Kamal Sayana, Arlington Heights, IL (US)

(73) Assignee: Motorola Mobility LLC, Chicago, IL (US)

( * ) Notice: Subject to any disclaimer, the term of this patent is extended or adjusted under 35 U.S.C. 154(b) by 298 days.

(21) Appl. No.: 13/364,205

(22) Filed: Feb. 1, 2012

(65) Prior Publication Data

US 2013/0196606 A1 Aug. 1, 2013

(51) Int. Cl.
*H04M 1/00* (2006.01)

(52) U.S. Cl.
USPC .................. 455/522; 455/67.11; 455/67.13; 455/73; 455/115.3; 455/525

(58) Field of Classification Search
USPC ........... 455/522, 73, 525, 67.13, 67.11, 115.3
See application file for complete search history.

(56) References Cited

U.S. PATENT DOCUMENTS

| | | | |
|---|---|---|---|
| 2008/0144582 A1 | 6/2008 | Das et al. | |
| 2008/0146154 A1 | 6/2008 | Claussen et al. | |
| 2011/0243007 A1* | 10/2011 | Xiao | 370/252 |
| 2012/0238305 A1* | 9/2012 | Xiao et al. | 455/509 |
| 2013/0084913 A1* | 4/2013 | Gaal et al. | 455/522 |
| 2013/0194953 A1* | 8/2013 | Xu et al. | 370/252 |

FOREIGN PATENT DOCUMENTS

| | | |
|---|---|---|
| WO | 2008093100 A2 | 8/2008 |
| WO | 2010035966 A2 | 4/2010 |
| WO | 2010107885 A2 | 9/2010 |
| WO | 2011034960 A1 | 3/2011 |
| WO | 2011054374 A1 | 5/2011 |

OTHER PUBLICATIONS

LG Electronics: "Uplink Power Control for CoMP", 3GPP Draft; R1-113989 Uplink Power Control for Comp, 3rdGeneration Partnership Project (3GPP), Mobile Competence Centre; 650, Route des Lucioles; F-06921 Sophia-Antipolis Cedex; France, vol. RAN WG1, No. San Francisco, USA 20111114-20111118, all pages.
Alcatel-Lucent Shanghai Bell: "Uplink Power control Considerations for CoMP", 3GPP TSG RAN WG1 Meeting #66, Athens, Greece, Aug. 22-26, 2011, R1-112415, pp. 1-6.

* cited by examiner

*Primary Examiner* — Sanh Phu (57) ABSTRACT

A wireless communication device includes a transceiver and a processor configured to determine a path loss between each of a plurality of communication nodes and the wireless communication device, determine an effective path loss based on the path loss determined for the each of the plurality of communication nodes and based on a corresponding weight for each of the plurality of communication nodes, and configured to determine a transmit power of the wireless communication device based on the effective path loss.

12 Claims, 6 Drawing Sheets

Remote Unit Determines a Path Loss Between the Remote Device and Each of a Plurality of Nodes

520

Determine Effective Path Loss Based on Path Loss For Each of the Plurality of Nodes and Based on a Corresponding Weight

530

Determines Transmit power of the Remote Unit Based on the Effective path Loss

Remote Unit Receives a Reference Signal From Each of a Plurality of Communication Nodes

620

Remote Unit Determines a Path Loss Between The Remote Device and Each of a Plurality of Nodes Based on the Reference Signal

630

Calculate Maximum Transmit Power Based on the Path Losses and Based on a Delay Associated With Each of the One or More Communication Nodes

UPLINK POWER CONTROL IN COORDINATED MULTI-POINT WIRELESS COMMUNICATION SYSTEM

FIELD OF THE DISCLOSURE

The present disclosure relates generally to wireless communications and, more particularly, to uplink power control in coordinated multi-point wireless communication system.

BACKGROUND

In communication systems that use orthogonal frequency division multiple access (OFDMA), single-carrier OFDMA, or SC-frequency division multiple access (FDMA), UE uplink (UL) transmission power is typically set according to some criteria that allows the transmission to be received with sufficient power at an eNB or other communication node (AP) or node without causing excessive interference to neighboring communications. Limiting UE transmit power also reduces UE power consumption thereby increasing battery life.

One method of controlling UE transmission power is to set the transmit power, $P_T$, according to the sum of an open loop transmit power $P_{OPEN}$ and a closed-loop correction term, $f_{CLOSED}$, subject to the constraint that a UE can transmit at most $P_{max}$:

$$P_T = \max(P_{max}, P_{OPEN} + f_{CLOSED}). \qquad \text{Eqn. (1)}$$

In this scheme the open-loop transmit power is equal to a target received power, $P_0$, plus a term that is proportional to an estimate of the DL path loss between the node and the UE, $PL_c$, $$P_{OPEN} = P_0 + \alpha \cdot PL_c (\text{dBm}). \qquad \text{Eqn. (2)}$$

In this expression $P_0$ is expressed in dBm and $PL_c$ is in dB. The proportionality factor, $\alpha$, termed the fractional path loss compensation factor, satisfies $0 \leq \alpha \leq 1$. When this factor is less than one, UE's farther from the received node, i.e. where the path loss is greatest and transmit power is greatest, are received with power less than those UE's with lower path loss. Reducing transmit power for the highest power UEs in this way limits inter-cell interference and ultimately increases system capacity. The target received power, $P_0$, is typically signaled to the UE over a DL control channel. The UE's estimate of the DL path loss can be obtained by measuring the average received power of a DL reference signal transmitted by the node to which UL transmissions will be directed and the reference signal's transmission power to obtain the estimated DL path loss estimate, $PL_c$. Using this value along with the signaled value of $P_0$ and $\alpha$, which is also signaled on a DL control channel, allows the open loop transmit power, $P_{OPEN}$, to be obtained.

The total UE transmit power is the open-loop transmit power $P_0$ plus the closed-loop term $f_{CLOSED}$ expressed in dB. The closed-loop term is signaled by the network using power control commands on a dynamic basis and can be used to fine-tune the total transmit power, for example to compensate for fast fading or to temporarily reduce inter-cell interference.

The power control procedure described above applies when a UE is transmitting to a single node in the network. Improved system capacity especially in terms of cell edge throughput can be achieved with cooperative multipoint reception (CoMP). In CoMP reception, a UE is received by not only a single node but simultaneously by multiple nodes. The nodes are typically geographically separated. Simultaneous reception at more than one node, termed joint reception, is particularly advantageous in heterogeneous deployments where different types of nodes are present in the network. For example, a network may include both macro and low power nodes (LPNs). Macro nodes, also referred to as eNodeBs, have a higher transmit power in the DL than LPNs and consequently a larger coverage area. LPNs on the other hand have a smaller coverage area but are useful for providing hot-spot coverage in areas of high user density. LPNs may also be connected to macro nodes through a high speed link, such as a fiber link. LPNs connected in this fashion may be referred to as remote radio heads (RRHs) or remote radio units. In such a system a UE's UL transmission may therefore simultaneously be received by a macro node plus one or more low power nodes. Decoding UE transmissions is performed by a reception processor connected to the macro node and LPN or RRH. Alternatively, the reception processor could be located within the macro node itself.

UL power control is also required for multiple reception nodes to control inter-cell interference and reduce UE power consumption. The power control procedure described above for the single reception node case, however, cannot be used because the determination of an open loop transmit power requires an estimation of DL path loss between the UE and a single receiving node. However, in the presence of multiple receiving nodes (which may be of different types), the ability of a reception processor to successfully decode a UE transmission signal is a function of the power received at all of the reception nodes. Open-loop power control is therefore a function of not only a single path loss but of multiple path losses.

Another case where open-loop power control is a function of multiple path losses occurs when a UE interferes with one or more nodes, called victim nodes, which receive transmissions from other UEs in the system. This is particularly problematic when propagation delay between the interfering UE and the victim node is large enough that the propagation delay plus any multipath delay spread exceeds the system's cyclic prefix (CP). In OFDMA and SC-FDMA systems, a cyclic prefix which corresponds to an end portion of a block of the FFT-modulated signal is repeated at the beginning of the block. This operation suppresses intersymbol interference as long as the delay in the channel is less than the length of the CP. When the channel between a UE and a victim node is such that the sum of the propagation delay and multipath delay spread is larger than the CP, intersymbol interference occurs and demodulation performance at the victim node is impacted adversely. This problem can be lessened by appropriately setting the transmission power of the interfering UE such that the interference received at the victim node is not too high. Given the propagation losses between a UE and both its desired reception point(s) and victim reception point(s), the problem is therefore to determine a transmit power that allows sufficient received powers at the desired UE reception point while not causing excessive interference at the victim nodes. Both in the case of a UE transmitting to multiple nodes and the case of a UE transmitting to one or more nodes but causing interference at other node(s) there is a need for power control based on path losses to more than a single node. Accordingly, a need exist for a power control procedures which adjust transmit power based on path losses to multiple nodes.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
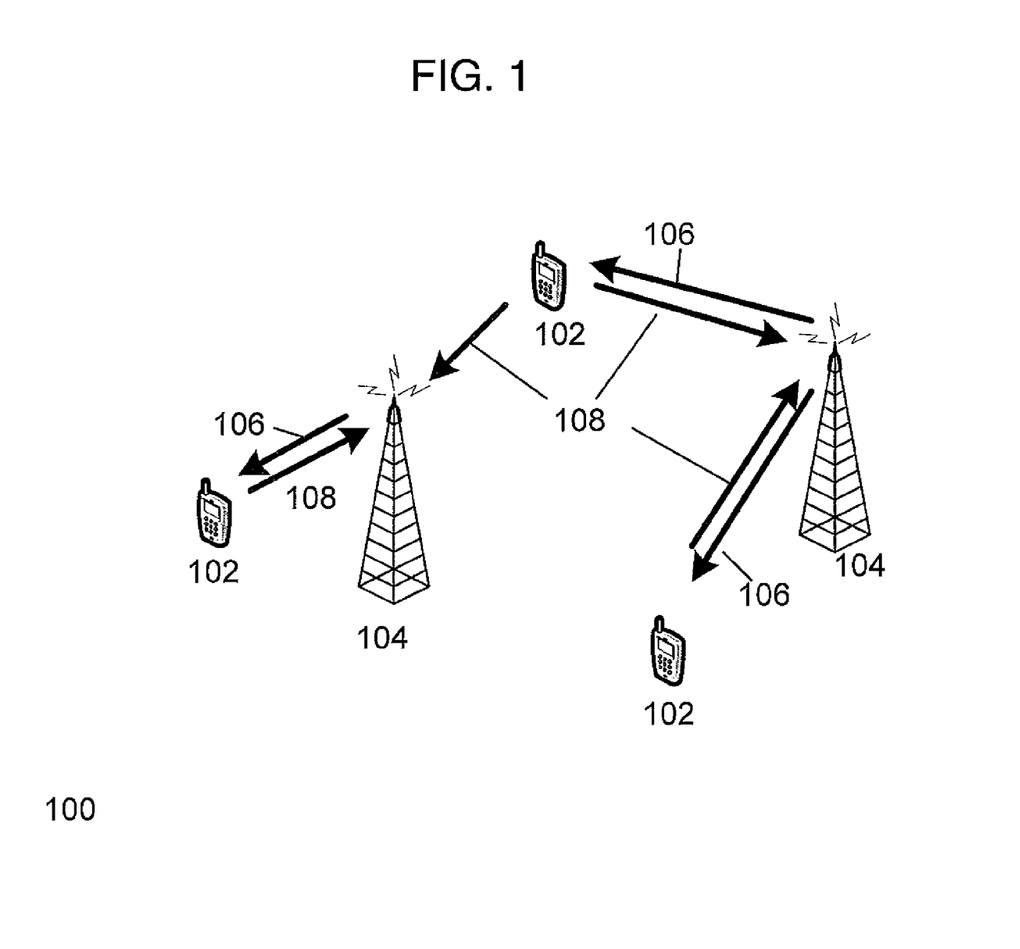
FIG. 1 is a wireless communication system.

In FIG. 1, a wireless communication system 100 comprises remote units 102 communicating with one or more wireless communication nodes 104 typically forming a network distributed over a geographical region for serving mobile stations in the time, frequency, code or spatial domain or a combination thereof. The communication nodes may be embodied as macro nodes or low power nodes (LPNs) of the system infrastructure. Macro nodes, also referred to as base stations, have a higher transmit power in the DL than LPNs and consequently a larger coverage area. LPNs on the other hand have a smaller coverage area but are useful for providing hot-spot coverage in areas of high user density. LPNs may also be connected to macro nodes through a high speed link, such as fiber link. LPNs connected in this fashion may be referred to as remote radio heads (RRHs) or remote radio units. A communication node could also be embodied as a relay node (RN) or an access point (AP) or some other wireless transceiver of the system. The communication node may also be referred to as a base unit, access terminal, base, NodeB, enhanced NodeB (eNodeB), Home NodeB (HNB), Home eNodeB (HeNB), Macro eNodeB (MeNB), Donor eNodeB (DeNB), femtocell, femto-node, pico-cell, network node or by other terminology used in the art or as defined further below. The communication nodes each comprise one or more transmitters for DL transmissions 106 and one or more receivers for UL transmissions 108. The communication nodes are generally part of a radio access network (RAN) that includes one or more controllers communicably coupled to one or more corresponding nodes. The access network (AN) is generally communicably coupled to one or more core networks, which may be coupled to other networks like the Internet and a public switched telephone network (PSTN) among others. These and other elements of access and core networks are not illustrated but are known generally by those having ordinary skill in the art. In other implementations, more generally the communication nodes comprise an ad hoc network or other network without a distinct delineation between an access and core networks.

In FIG. 1, the one or more communication nodes 104 typically serve the remote units 102 within corresponding serving areas, for example, a cell or a cell sector, via a wireless communication link. The remote units may be fixed or mobile. The remote units may be referred to as subscriber units, mobiles, mobile stations, mobile units, users, terminals, subscriber stations, user equipment (UE), user terminals, wireless communication devices, relay nodes, or by other terminology used in the art. The remote units also comprise one or more transmitters and one or more receivers. The remote units may also communicate with the base unit via a relay node.

In one implementation, the wireless communication system is compliant with the 3GPP Universal Mobile Telecommunications System (UMTS) LTE protocol, also referred to as EUTRA. The instant disclosure is particularly relevant to 3GPP LTE Release 8 (Rel-8) and later versions thereof. The present disclosure is more generally applicable to other existing or future wireless communication systems, such as the IEEE 802.11 and IEEE 802.16 series of specifications. Thus the present disclosure is not to be limited to implementation in any particular wireless communication system architecture or protocol.

Figure 2:
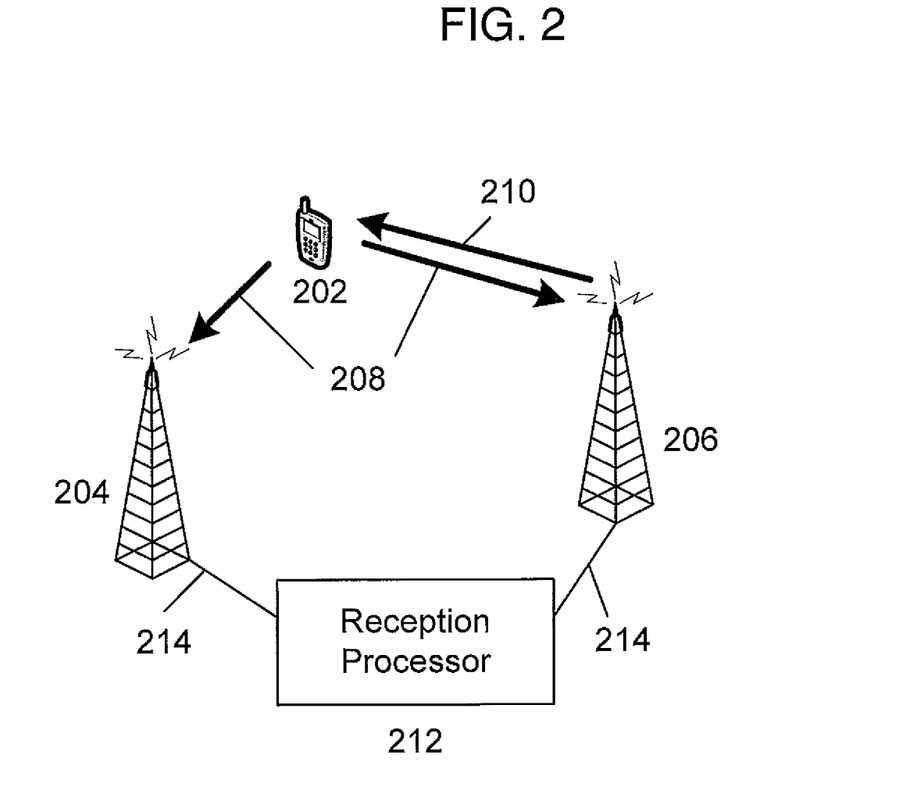
FIG. 2 illustrates a first embodiment of the disclosure.

FIG. 2 illustrates a first embodiment where a UE 202 communicates with wireless communication nodes 204 and 206. The communication nodes 204 and 206 are reception points for UL signal 208 transmitted by the UE. The nodes 204 and 206 are also transmission points for DL reference signals (not shown). In some embodiments, some of the DL reference signals such as common reference signals may be transmitted by one node, say 206, but not by the other node, say 204. The node 206 is also a transmission point for DL control and data signals 210, which are transmitted to the UE 202. The nodes 204 and 206 may be controlled by the same eNB (not shown) as when node 204 is an LPN or RRH. The nodes 204 and 206 may also be controlled by different eNBs. In FIG. 2, the nodes 204 and 206 are connected to a reception processor 212 by high speed links 214. The reception processor uses the UL received signals from the nodes 204 and 206 to determine information transmitted on the UL by the UE. The reception processor may be part of the eNB, which controls either node 204 or 206 or the reception processor may be a separate entity. The functionality of the reception processor and the mechanism by which it processes, e.g., decodes, information transmitted by the UE is well known generally to those having ordinary skill in the art and thus not described further herein.

In FIG. 2, the UE transmit power is adjusted so that there is sufficient power received at the nodes 204 and 206 to enable efficient decoding of the UL signal by the reception processor. However if the UE transmit power is too large, power consumption at the UE may be unnecessarily excessive and, in addition, UL transmissions may cause excessive interference to other nodes in the system. The transmit power of the UE at the ith transmission interval (e.g., subframe), $P_T(i)$, can be expressed in dB as the sum of open and closed loop terms and limited by a maximum power $P_{max}$ in dB as:

$$P(i) = \max(P_{max}, P_{OPEN} + f_{CLOSED}(i)) \qquad \text{Eqn. (3)}$$

The open loop transmit power in dB, $P_{OPEN}$ which varies slowly with time in comparison to $f_{CLOSED}(i)$, is based on measurements of the DL path losses to the reception points, nodes 204 and 206 in FIG. 2. The UE obtains these DL path losses based on measuring received DL reference signal power from the corresponding communication nodes. In some embodiments, the UE filters the reference signal power measurements to improve estimation accuracy of the reference signal received power. The UE also has knowledge of the transmitted DL reference signal power at each node from which the DL reference signals are transmitted. A ratio of the DL reference signal power transmitted from a particular node to the DL reference signal received power at the UE is indicative of the DL path loss for the node. The DL path loss for node n, n=1, . . . , N when expressed in dB will be denoted $P_{L,n}$.

The form of $P_{OPEN}$ is described further below. The closed-loop correction term $f_{CLOSED}(i)$, expressed in dB, is a function of power control commands sent by a transmission site, for example, communication node 206 in FIG. 2. The closed-loop correction term allows the eNodeB to fine tune the power received from a UE. An example $f_{CLOSED}(i)$ can be the result of power control commands, $\delta(i)$, taking values of $\pm\Delta$ dB. One example of $f_{CLOSED}(i)$ is simply a delayed version of the power control command:

$$f_{CLOSED}(i)=\delta(i-D). \quad \text{Eqn. (4)}$$

where D is a delay in transmission intervals. A second example is $f_{CLOSED}(i)$ being an accumulated version of the delayed power control commands:

$$f_{CLOSED}(i)=f_{CLOSED}(i-1)+\delta(i-D). \quad \text{Eqn. (5)}$$

Returning now to the open loop term $P_{OPEN}$, which is a function of the path losses to all of the reception points, $P_{L,1}, \ldots, P_{L,N}$, can be expressed as a function, $F_{OPEN}$, of an effective path loss $P_{L,eff}$, expressed in dB, which in turn is a function $g_{eff}$ of path losses the $P_{L,1}, \ldots, P_{L,N}$:

$$P_{OPEN}=F_{OPEN}(P_{L,eff})$$

$$P_{L,eff}=g_{eff}(P_{L,1},\ldots,P_{L,N}) \quad \text{Eqn. (6)}$$

The function $F_{OPEN}$ may take a similar form to that used when a single reception site is available, namely:

$$F_{OPEN}(P_{L,eff})=P_0+\alpha P_{L,eff} \quad \text{Eqn. (7)}$$

Here $P_0$, which is in units of power such as dBm, represents a desired received signal power at a reception site and $\alpha$ is a fractional path loss compensation factor that satisfies $0 \leq \alpha < 1$. Another form for $F_{OPEN}$ is simply $F_{OPEN}(P_{L,eff})=P_{L,eff}$. Other forms of $F_{OPEN}(P_{L,eff})$ may also be used.

The function $g_{eff}(P_{L,1}, \ldots, P_{L,N})$ may take one of several forms. In one form a set of weights $w_1, \ldots, w_N$ are used by the UE in the computation of $g_{eff}(P_{L,1}, \ldots, P_{L,N})$. Each weight $w_n$ corresponds to one path loss $P_{L,n}$. The weights may not be all identical. These weight indications are signaled on a control channel by one or more transmission points to the UE. In one embodiment, the signaling is a higher layer signaling. In another embodiment, multiple set of weights are configured for the UE by higher-layer signaling and weight-set selection between the multiple configured set of weights is indicated to the UE within a resource assignment grant message signaled to the UE on a downlink control channel. The indicated weight-set is used by the UE to determine the effective path loss. Based on the combination of these weights and the set of path losses, the effective path loss is expressed as:

$$P_{L,eff}=g_{eff}(P_{L,1}, \ldots, P_{L,N}; w_1^{dB}, \ldots, w_N^{dB}). \quad \text{Eqn. (8)}$$

In the above and following equations the weights is expressed in dB to match the form of the path losses:

$$w_n^{dB}=10 \log_{10}(w_n). \quad \text{Eqn. (9)}$$

However, it should be well understood that other forms of units such as linear domain units can be used for the weights and/or the path losses and is well within the scope of the invention. Path loss in the equations can be replaced by a reciprocal of a transmission gain between the communication node and the UE in linear domain and path loss and transmission gain may be used interchangeably with the reciprocal relationship.

The weight associated with a path loss is indicative of the importance a particular path loss has in the calculation of the effective path loss. One scenario where this form may be used is when there is a potential set of N reception points that may be used by the network to receive a UE's transmission. At a given time, a subset of these N reception points may actually be used for demodulating the UE's signal. By signaling a $w_n=1$ for those sites that are to be used and a $w_n=0$ for those sites that are not be used, the UE can be informed of the relevant path losses to use in the computation of the effective path loss. A special case is where all weights are zero except for one which is a non-zero weight. The effective path loss in this latter case would be equal to a path loss corresponding to the non-zero weight.

A second form of the effective path loss has the path losses weighted directly by the weights. Path loss n is weighted by weight $w_n$ to form a weighted path loss. The effective path loss is then a function of the set of weighted path losses:

$$P_{L,eff}=g_{eff}(w_1^{dB}+P_{L,1}, \ldots, w_N^{dB}+P_{L,N}) \quad \text{Eqn. (10)}$$

The set of weights may take values other than 0 and 1 (in linear scale). One such case is where different reception points have different configurations, e.g., number of receive antennas or receiver RF (radio frequency) front-end noise figure. The number of receive antennas affects the amount of received power, the more receive antennas, the higher the received signal power. In one embodiment, one or more reception points with a larger number of receive antennas may have weights which are smaller than reception points with fewer antennas. In another embodiment, the opposite may be used—higher weight for one or more reception points with larger number receive antennas than reception points with fewer antennas. Similarly, a receiver with a higher noise figure will inject more noise which effectively reduces the received signal power. In one embodiment, one or more reception points will larger noise figures may have correspondingly larger weights. Another instance is when the reliability of path loss measurements varies. In this case a positive weight greater than 1 in linear units may be used to increase the transmit power to compensate for an unreliable path loss estimate.

A third form of the effective path loss is characterized by taking a reciprocal of a summation of reciprocal of weighted path losses in linear units. In this formulation the effective path loss takes the form:

$$P_{L,eff} = g_{eff}(w_1^{dB}+P_{L,1}, w_2^{dB}+P_{L,2}, \ldots, w_N^{dB}+P_{L,N}) =$$

$$\left( \frac{1}{\frac{1}{(w_1^{dB}+P_{L,1})_{lin}} + \frac{1}{(w_2^{dB}+P_{L,2})_{lin}} + \ldots + \frac{1}{(w_N^{dB}+P_{L,N})_{lin}}} \right)_{dB}$$

of Eqn. (11). The notation $(\bullet)_{dB}$ denotes conversion to dB and conversely the notation $(\bullet)_{lin}$ denotes conversion to linear units. In this formulation the weight factors can assume very large values, effectively removes the corresponding path loss component from the computation of $P_{L,eff}$.

A fourth form of the effective path loss involves taking the minimum weighted path loss among the set of N non-zero weighted path losses:

$$P_{L,eff} = \min_{n: w_n^{dB}+P_{L,n} > -\infty} (w_n^{dB}+P_{L,n}). \quad \text{Eqn. (12)}$$

The open-loop power therefore becomes dependent on the path loss to the reception point with smallest path loss and the higher path losses to all other reception points do not affect the open loop power. This may be useful in a scenario where it is desired to set the open-loop power just high enough to result in a desired power at the best receiving reception point.

In a fifth form the effective path loss is found by taking the maximum weighted path loss among the set of N weighted path losses:

$$P_{L,eff} = \max_n (w_n^{dB}+P_{L,n}). \quad \text{Eqn. (13)}$$

This corresponds to the case where it is desired to set the open-loop power large enough to insure a desired received power at all reception points.

In a sixth form the effective path loss is found by a function of the N path losses, each raised to a power where the power is the path's corresponding weight:

$$P_{L,eff}=g_{eff}(w_1^{dB} P_{L,1}, \ldots, w_N^{dB} P_{L,N}). \quad \text{Eqn. (14)}$$

In a seventh form the effective path loss is a function of the N path losses, each raised to a power where the power is the path's corresponding weight and scaled by scaling factor:

$$P_{L,eff} = g_{eff}(c_1 + w_1^{dB} P_{L,1}, \ldots, c_N + w_N^{dB} P_{L,N}). \quad \text{Eqn. (15)}$$

where $c_1, \ldots, c_N$ is a set of scaling factors in dB, each corresponding to one path loss.

Figure 3:
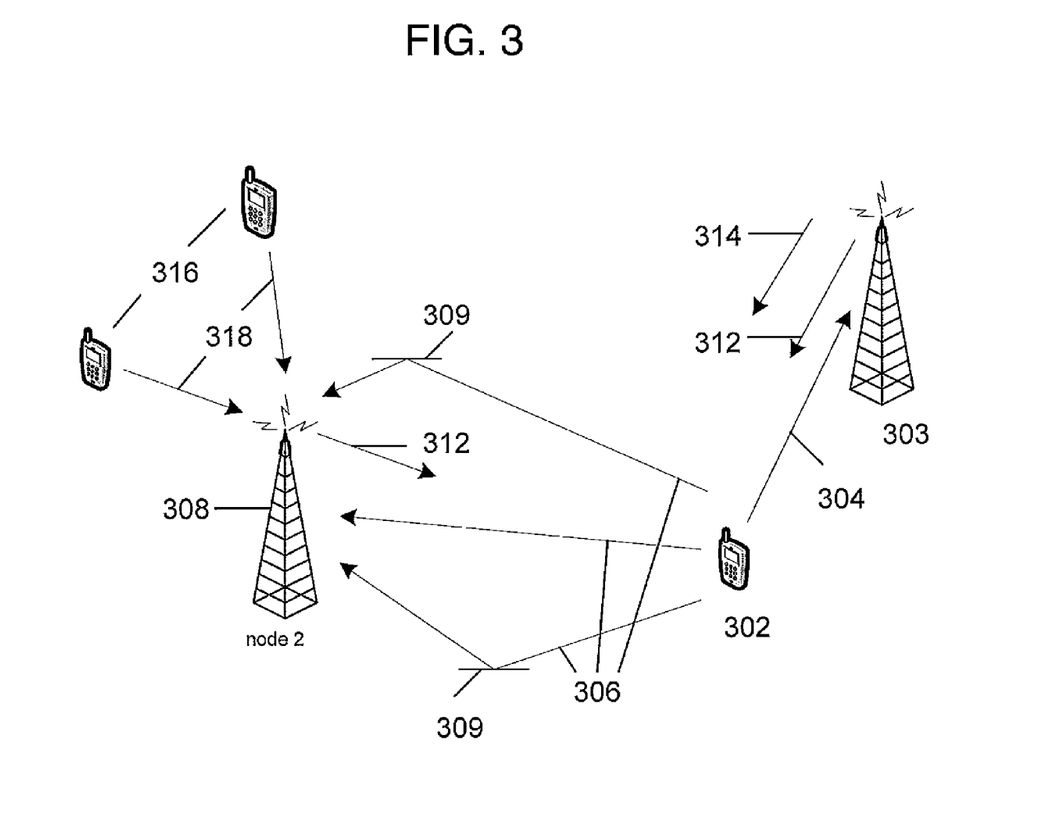
FIG. 3 illustrates a second embodiment of the disclosure.

FIG. 3 illustrates a second embodiment where the UE 302 transmits UL information 304 intended for wireless communication node 303 only. There are however propagation paths to the victim node 308, some of which may be the result of reflection or scattering off of objects 309 such as buildings or mountains. The signal 306 received through the multiple propagation paths at victim node 308 may cause interference to the reception of signals 318 transmitted by UE 316 to node 308. Interference may occur if the propagation delay between UE 302 and node 308, when added to the multipath delay spread caused from multipath reflections and scatterings, exceeds the system CP length, thereby causing intersymbol interference to the reception by node 308 of transmissions from UE 316. In FIG. 3, nodes 303 and 308 both transmit DL reference signals 312. The node 303 and 308 may be LPNs, RRHs or other entities describes above. Additionally, node 303 also is a DL transmission point for UE 302 and, in addition to DL reference signals, transmits control information and data 314 to the UE. FIG. 3 may be generalized to the case where transmissions from one or more UEs are received by more than one reception points and/or interferes with one or more reception points.

In FIG. 3, the UE 302 measures the DL path losses between itself and communication nodes 303 and 308 based on reference signals 312 received from each of these nodes as described above. The UE 302 needs to set its transmit power in such a way that its UL signal can be received by node 303 with sufficient power while minimizing interference at node 308, where signal 306 may cause intersymbol interference to the reception of the UL signals 318 from UEs 316 to node 308. The UE 302 must first have information on whether its transmissions will cause intersymbol interference at other nodes in the network. This information can be inferred from the propagation delays between the UE 302 and the other nodes. Such delays may be obtained by the UE either directly by measurement of reference signals or it may be signaled to the UE by the network on a DL control channel. In the latter case, the delay may be directly signaled as a message with a field indicating the delay, which may be specified microseconds or specified number of samples at a predetermined sampling rate, for example. The delay to a node may be an absolute delay or a relative delay with respect to the delay to one of the nodes. The delay signaling to the UE by the network may be a higher-layer signaling. Alternatively, the delay may be signaled in the form of a virtual timing advance (TA) command. The virtual TA command contains a field that gives an UL timing advance value $\tau_{TA}$ such that if an UL transmission is begun $\tau_{TA}$ before the earliest arriving DL path transmitted by the node, then that UL signal will be received by the node time-aligned with its UL reference timing. The virtual TA command corresponding to a node may be an absolute timing advance value or a relative timing advance value with respect to the timing advance value corresponding to one of the nodes. The virtual TA command signaling to the UE by the network may be a higher-layer signaling.

Once the UE 302 knows the delays to the nodes to which it may potentially cause interference, it can decide whether its UL power should be reduced or limited in order to minimize intersymbol interference to these nodes. One way the UE 302 may do this is by comparing the set of delays to potential victim nodes with a threshold. If one or more delays exceed a threshold, then the UE transmit power could be adjusted to minimize interference to nodes with delays above the threshold. In one embodiment, the UE transmit power is based on one or more path losses with corresponding delay less than the threshold. The determination of the UE transmit power based on more path loss is described more fully below. The effective path loss can be a function of the path losses $P_{L,1}, \ldots, P_{L,N}$, the weights, $w_1^{dB}, \ldots, w_N^{dB}$, and additionally the delays $d_1, \ldots, d_N$ associated with the one or more communication nodes.

$$P_{L,eff} = g_{eff}(P_{L,1}, \ldots, P_{L,N}; w_1^{dB}, \ldots, w_N^{dB}; d_1, d_2, d_3 \ldots d_n) \quad \text{(Eqn. 15)}$$

In another embodiment, the weights are a function of such delays $$P_{L,eff} = g_{eff}(P_{L,1}, \ldots, P_{L,N}; w_1^{dB}, \ldots, w_N^{dB})$$

$$w_1^{dB}, \ldots, w_N^{dB} = f(d_1, d_2, d_3 \ldots d_n). \quad \text{(Eqn. 16)}$$

In another embodiment, the weights are determined based on the equation below:

$$w_i = \begin{cases} 0, & d_i > d_{th} \\ > 0, & \text{otherwise.} \end{cases} \quad \text{(Eqn. 17)}$$

where $d_{th}$ is the delay threshold. In other words, for the communication nodes which have a larger delay (than a threshold) to the user device, one can assume that such a node may not effectively receive the data associated with the device. In such a case, a user device may exclude the corresponding node in the transmit power computation, which is equivalent to modification of corresponding weights to zero.

Other embodiments to deriving the weights as a more general function of such delays can also be envisioned. In one example, a network may also signal one or more additional correction factors one or more weights as a function of the delay or based on certain delay thresholds. Such correction factors may capture the loss of receive power/quality at a node caused by large delays in reception.

Assuming the UE 302 determines that its transmit power must be constrained to limit interference received at a node, its output power can be set to not exceed some specified level. The power limitation may be expressed as $$P_T = \max(P_{INT,max}, P_{OPEN} + f_{CLOSED}) \quad \text{Eqn. (18)}$$

where $P_{INT,max}$ is a maximum transmit power allowed, expressed in dB, when a UE's transmission causes intersymbol interference at a node in the network. The value of $P_{INT,max}$ may be signaled by the network on a DL control channel or may be calculated by the UE. The signaling may be a higher-layer signaling. In the latter case, the UE may calculate $P_{INT,max}$ based on a measured DL path loss between the UE and the victim node and a maximum allowable received interference level, $I_{max}$, at the victim node as signaled by the network. When there is only a single victim node, the UE computes its maximum transmit power according to $$P_{INT,max} = P_{L,int} + I_{max} \quad \text{Eqn. (19)}$$

where $P_{L,int}$ is the DL path loss to the victim reception point and $P_{L,int}$ and $I_{max}$ are both expressed in dB. If there are multiple victim reception points, then the maximum transmit power is set so that the interference level at all victim reception points is less than the maximum allowable received interference level, $I_{max}$. This may be expressed as $$P_{INT,max} \leq P_{L,int}(i) + I_{max}, i=1, \ldots, N_{int}. \quad \text{Eqn. (20)}$$

Where $N_{int}$ is the number of victim reception points and $P_{L,int}(i)$, $i=1, \ldots, N_{int}$ are the measured path losses between the victim reception nodes and the UE.

Figure 4:
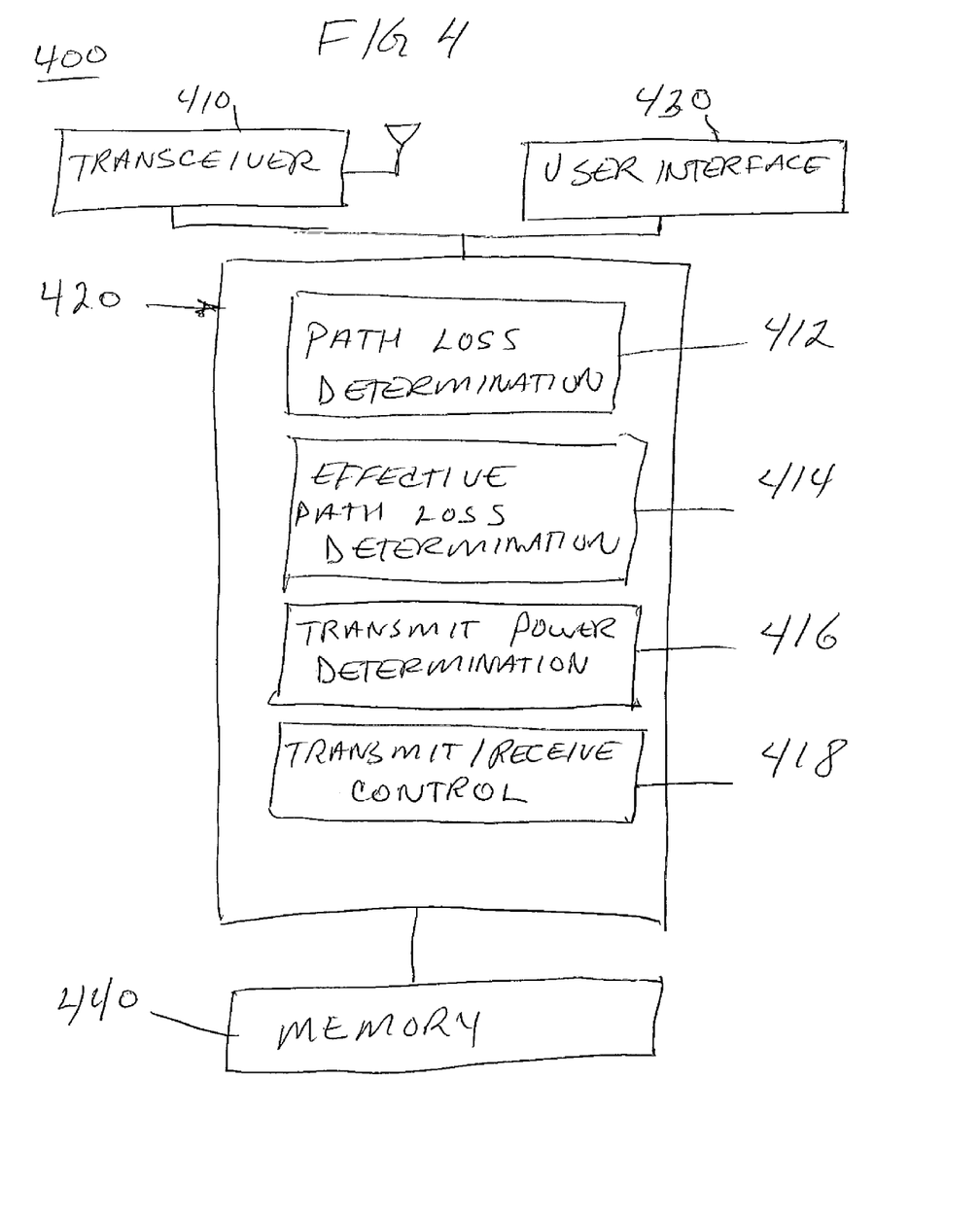
FIG. 4 is a schematic block diagram of a remote unit.

In FIG. 4, a remote unit 400 for example comprising a transceiver 410 communicably coupled to a controller or processor 420. The remote unit implements a wireless communication protocol, as discussed above, and may be capable of conducting circuit or packet switched communications or both. The remote unit 400 of FIG. 4 may correspond to the UE 202 in FIG. 2 or the UE 302 of FIG. 3. In FIG. 4, the UE also typically comprises a user interface 430 for performing other functionality associated with wireless communication terminals, including but not limited to a tactile and/or other inputs, a display, and audio inputs and outputs, among other user interfaces. These and other elements, features and functions of remote units are well known to those of ordinary skill in the art and are not described further herein. Moreover, wireless communications need not be the primary function of the remote unit 400. In one embodiment, the controller 420 is implemented as a digital processor that executes instruction stored in one or more memory devices or elements 440 to perform the functionality described herein. Alternatively, the controller may be implemented as an equivalent hardware circuit or as a combination of hardware and software circuits. These and other aspects of the remote unit are described further herein.

Figure 5:
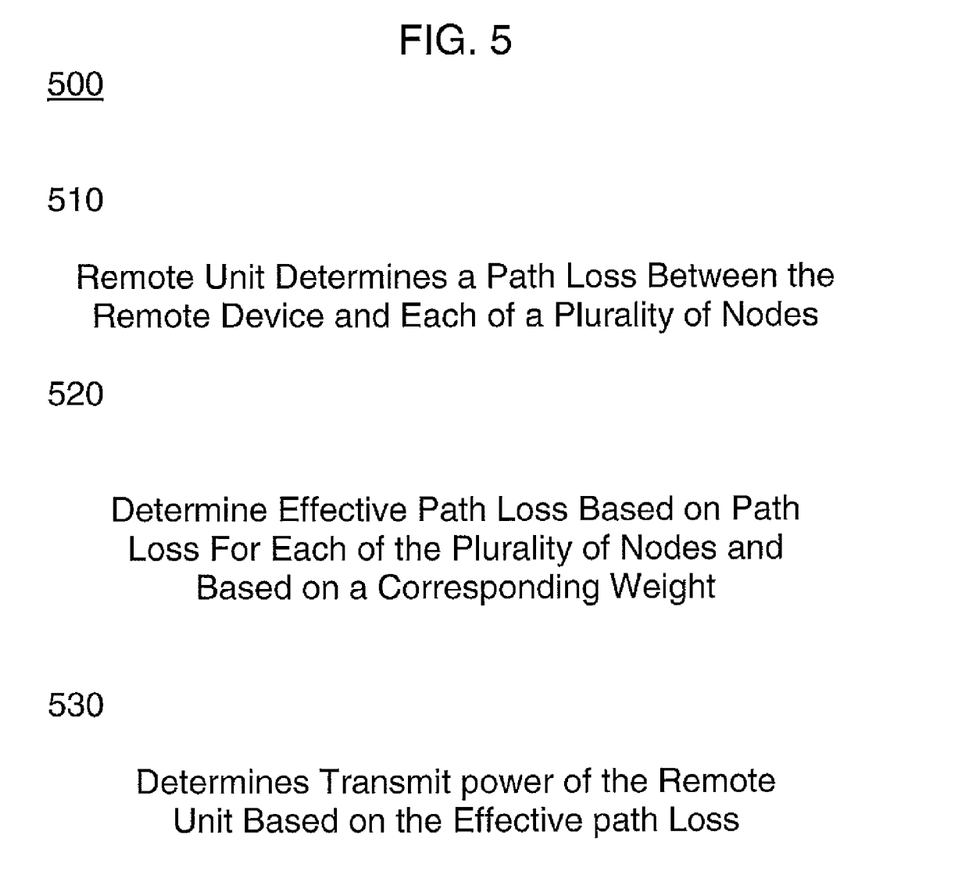
FIG. 5 is a first process flow diagram.

In FIG. 5, a process 500 is implemented in a wireless communication device also referred herein to as a remote unit. At 510, the remote unit determines a path loss between the remote unit and each of a plurality of communication nodes. In one embodiment, the path loss is a reciprocal of a transmission gain between the communication node and the remote unit, wherein the path loss and transmission gain may be used interchangeably with the relationship:

$$\text{Path loss}=1/(\text{transmission gain})(\text{in linear domain}) \quad \text{Eqn. (21)}$$

In FIG. 4, the processor includes path loss determination functionality 412 that is readily implemented by executing programmed instructions embodied as firmware or software stored in memory, where upon execution the software or firmware configures the processor to perform the path loss determination functionality. Alternatively, the path loss determination functionality may be implemented by equivalent hardware circuits or by a combination of hardware and software.

In FIG. 5, at 520, the remote unit determines an effective path loss based on the path loss determined for the each of the plurality of communication nodes and based on a corresponding weight for each of the plurality of nodes. The weights for each of the plurality of nodes may not be all identical. In FIG. 4, the processor includes effective path loss determination functionality 414 that is readily implemented by executing programmed instructions embodied as firmware or software stored in memory, where upon execution the software or firmware configures the processor to perform the effective path loss determination functionality. Alternatively, the effective path loss determination functionality may be implemented by equivalent hardware circuits or by a combination of hardware and software.

In one embodiment, as described herein, the remote unit determines a weight corresponding to each of the one or more nodes. In some embodiments, the path loss for some or all of the nodes is scaled by a scaling factor. The scaling factor may be the same or different for the various communication nodes. In one particular implementation, the weight for one of the communication nodes is non-zero and weights for all of the other nodes are zero. According to this embodiment the effective path loss is equal to the path loss having the non-zero weight as described more fully hereinabove.

In another embodiment, the remote unit determines or calculates a weighted path loss for each node as a product of the path loss and weight associated with the corresponding node. The remote unit also computes a summation of a reciprocal of each of the plurality of weighted path losses. According to this embodiment, the effective path loss is a reciprocal of the summation as described more fully hereinabove.

In yet another embodiment, the remote unit determines or calculates a weighted path loss for each of node as a product of the path loss and weight associated with the corresponding node. The remote unit also identifies a single one of the plurality of weighted path losses having a minimum non-zero value, wherein the effective path loss corresponds to the weighted path loss having the minimum non-zero value as described more fully hereinabove.

In yet another embodiment, the remote unit determines or calculates a weighted path loss for each of node as a product of the path loss and weight associated with the corresponding node. The remote unit also identifies a single one of the plurality of weighted path losses having a maximum value, wherein the effective path loss corresponds to the weighted path loss having the maximum value as described more fully above.

In another embodiment, the effective path loss is based on each path loss raised to a power term, wherein the power term is based on the corresponding weight.

In FIG. 5, at 530, the remote unit determines a transmit power of the remote unit based on the effective path loss. In FIG. 4, the processor includes transmit power determination functionality 416 that is readily implemented by executing programmed instructions embodied as firmware or software stored in memory, where upon execution the software or firmware configures the processor to perform the transmit power determination functionality. Alternatively, the transmit power determination functionality may be implemented by equivalent hardware circuits or by a combination of hardware and software.

The remote unit transmits an uplink signal at a transmit power that is less than or not exceeding the maximum transmit power. In FIG. 4, the processor includes control functionality 418 that configures the transceiver to transmit and receive signals. The transmit/receive control functionality may be implemented by firmware or software stored in memory, where upon execution the software or firmware the processor is configured to control the transceiver. Alternatively, the transceiver control functionality may be implemented by equivalent hardware circuits or by a combination of hardware and software.

Figure 6:
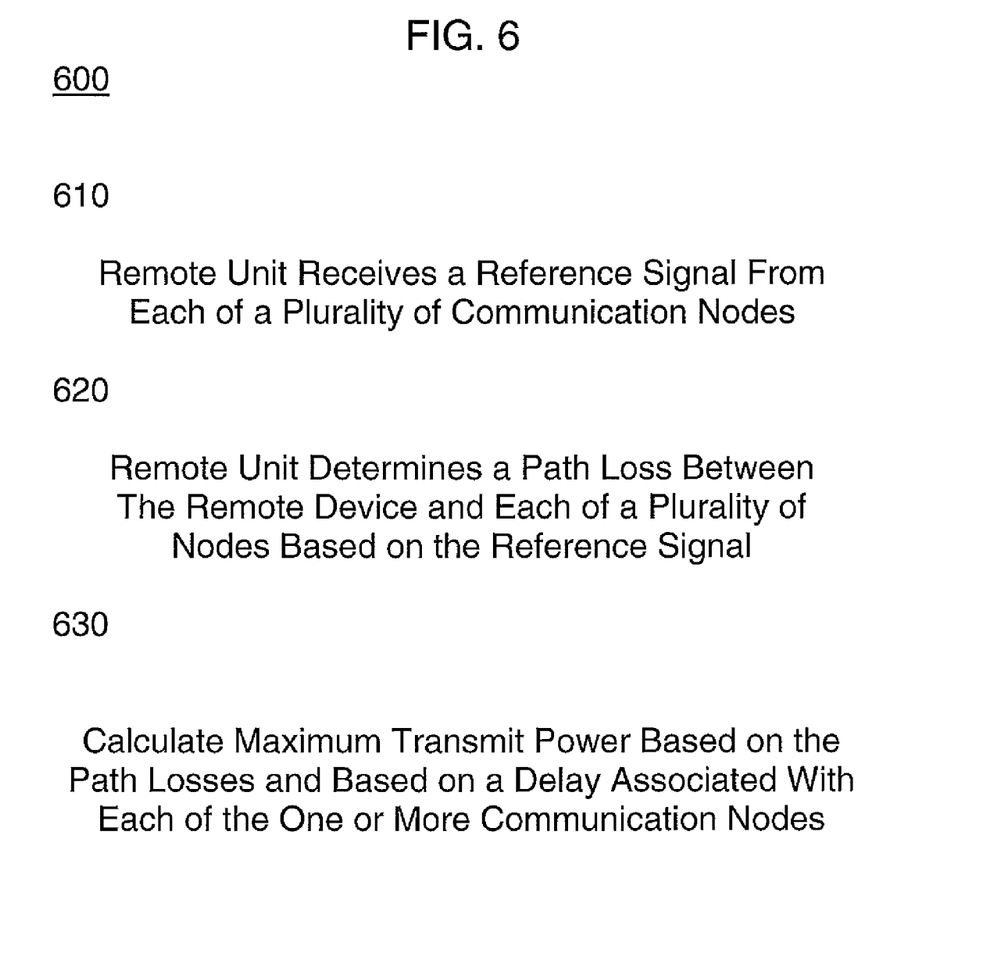
FIG. 6 is a second process flow diagram.

In FIG. 6, a process 600 is implemented in a wireless communication device also referred herein to as a remote unit. At 610, the remote unit receives a reference signal from each of a plurality of communication nodes. As discussed above in connection with FIG. 4, the processor configures the transceiver as receive signals including the reference signals from the nodes.

In FIG. 6, at 620, the remote unit determines a path loss between the remote unit and each of a plurality of communication nodes based on the reference signal received from the corresponding node. In one embodiment, the path loss is a reciprocal of a transmission gain between the communication node and the remote unit, wherein the path loss and transmission gain may be used interchangeably with the relationship described above. In FIG. 4, the path loss determination functionality 412 may be readily implemented to determine the path loss for each node based on a corresponding reference signal by executing programmed instructions embodied as firmware or software stored in memory, where upon execution the software or firmware configures the processor to perform the path loss determination functionality. Alternatively, the path loss determination functionality may be implemented by equivalent hardware circuits or by a combination of hardware and software.

In FIG. 6, at 630, the remote unit determines a maximum transmit power of the remote unit based on the path loss and based on a delay associated with each node. In a more particular implementation, the processor calculates the maximum transmit power by comparing the one or more delays to a threshold. In one embodiment, the remote unit receives information about the one or more delays from a particular communication node, which may be a node from which a reference signal is received or from some other node. The information about the one or more delays may include timing advance commands or other information from which the delay may be obtained as discussed herein. In another embodiment, the remote unit determines the plurality of delays based on measurements of the reference signals. In FIG. 4, the transmit power determination functionality 416 may be readily implemented to determine the maximum transmit power by executing programmed instructions embodied as firmware or software stored in memory, where upon execution the software or firmware configures the processor to perform the transmit power determination functionality. Alternatively, the maximum transmit power determination functionality may be implemented by equivalent hardware circuits or by a combination of hardware and software.

In one embodiment, the maximum transmit power of the remote unit is additionally based on a maximum allowed received interference level at one or more communication nodes due to transmission by the remote unit, wherein the maximum allowed received interference level is signaled by a particular communication node. In one implementation, the maximum transmit power of the remote unit is limited by a product of the maximum allowed received interference level and a path loss of one of the one or more communication nodes. In another implementation, the maximum transmit power of the remote unit is limited by a product of the maximum allowed received interference level and a path loss of the one or more path losses having a minimum value. In another implementation, the maximum transmit power of the wireless communication device is limited by a product of a maximum allowed received interference level and a path loss, for example, a minimum path loss, of the one or more path losses whose corresponding delay is greater than a threshold.

The processes of FIGS. 5 and 6 can be implemented separately or together.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication device comprising:
   a transceiver;
   a processor coupled to the transceiver, the processor configured to determine a path loss between each of a plurality of communication nodes and the wireless communication device, the processor configured to determine an effective path loss based on the path loss determined for the each of the plurality of communication nodes and based on a corresponding weight for each of the plurality of communication nodes wherein the plurality of weights are not all identical, and the processor configured to determine a transmit power of the wireless communication device based on the effective path loss;
   wherein the processor is configured to determine a weighted path loss for each of the plurality of communication nodes as a product of the path loss and the corresponding weight for the communication node; and
   wherein the effective path loss is based on a summation of a reciprocal of each of the plurality of weighted path losses, wherein the effective path loss is a reciprocal of the summation.

2. The device of claim 1 wherein the processor is configured to cause the wireless communication device to transmit an uplink signal at or less than the maximum transmit power.

3. A wireless communication device comprising:
   a transceiver;
   a processor coupled to the transceiver, the processor configured to determine a path loss between each of one or more communication nodes and the wireless communication device based on a corresponding reference signal received from each of the one or more communication nodes and the processor configured to calculate a maximum transmit power of the wireless communication device based on the path losses and based on one or more delays;
   wherein each of the one or more delays corresponds to each of the one or more communication nodes; and
   where the maximum transmit power of the wireless communication device is additionally based on a maximum allowed received interference level at one or more communication nodes due to transmission by the wireless communication device, wherein the maximum allowed received interference level is signaled by a particular communication node.

4. The device of claim 3 wherein the processor is configured to cause the wireless communication device to transmit an uplink signal at or less than the maximum transmit power.

5. The device of claim 3 wherein the transceiver is configured to receive information about the one or more delays from a particular communication node.

6. The device of claim 5 wherein the information about the one or more delays includes timing advance commands.

7. The device of claim 3 where the maximum transmit power of the wireless communication device is limited by a product of the maximum allowed received interference level and a path loss of the one or more path losses.

8. The device of claim 3 where the maximum transmit power of the wireless communication device is limited by a product of the maximum allowed received interference level and a path loss of the one or more path losses having a minimum value.

9. The device of claim 3 where the maximum transmit power of the wireless communication device is limited by a product of a maximum allowed received interference level and a path loss of the one or more path losses whose corresponding delay is greater than a threshold.

10. The device of claim 3 wherein the processor is configured to determine the plurality of delays based on measurements of the reference signals.

11. The device of claim 3 wherein the processor is configured to calculate the maximum transmit power in part by comparing the one or more delays to a threshold.

12. The device of claim 11 wherein the processor is configured to cause the wireless communication device to transmit an uplink signal with a transmit power at or less than the maximum transmit power wherein the transmit power is determined based on one or more path losses corresponding to communication nodes with corresponding delay less than the threshold.

\* \* \* \* \*